United States Patent
Sugimoto et al.

(10) Patent No.: US 7,586,440 B2
(45) Date of Patent: Sep. 8, 2009

(54) INDEPENDENT POSITIONING DEVICE AND INDEPENDENT POSITIONING METHOD

(75) Inventors: Sueo Sugimoto, Osaka (JP); Yukihiro Kubo, Kusatsu (JP); Kazunori Kagawa, Toyota (JP); Yasuhiro Tajima, Toyota (JP); Mitsuru Nakamura, Toyota (JP)

(73) Assignees: The Ritsumeikan Trust, Kyoto (JP); Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/660,793

(22) PCT Filed: Aug. 25, 2005

(86) PCT No.: PCT/JP2005/015404

§ 371 (c)(1),
(2), (4) Date: Nov. 19, 2007

(87) PCT Pub. No.: WO2006/022318

PCT Pub. Date: Mar. 2, 2006

(65) Prior Publication Data

US 2008/0258966 A1 Oct. 23, 2008

(30) Foreign Application Priority Data

Aug. 25, 2004 (JP) ............................. 2004-244808

(51) Int. Cl.
*G01S 1/02* (2006.01)
*G01S 5/14* (2006.01)

(52) U.S. Cl. ............................. 342/357.12; 342/357.04; 342/357.13

(58) Field of Classification Search ............ 342/357.04, 342/357.12, 357.15, 357.16, 357.13; 701/213, 701/215
See application file for complete search history.

(56) References Cited

U.S. PATENT DOCUMENTS

| 5,828,336 A | 10/1998 | Yunck et al. |
| 5,899,957 A | 5/1999 | Loomis |
| 5,963,167 A | 10/1999 | Lichten et al. |
| 6,373,432 B1 | 4/2002 | Rabinowitz et al. |

(Continued)

FOREIGN PATENT DOCUMENTS

JP 2-134587 5/1990

(Continued)

OTHER PUBLICATIONS

English translation of the International Preliminary Report on Patentability mailed Mar. 29, 2007 in corresponding PCT Application No. PCT/JP2005/015404.

(Continued)

*Primary Examiner*—Dao L Phan
(74) *Attorney, Agent, or Firm*—Nixon & Vanderhye, P.C.

(57) ABSTRACT

A linear regression equation is comprised of the objective variables and the explanatory variables. The objective variables are comprised of the L1 carrier phases, the L2 carrier phases, the C/A code pseudorange, the P(Y) code pseudorange, the clock error data, the delay data of the ionosphere, and the delay data of the troposphere that related with every satellite respectively. The explanatory variables are comprised of at least the integer ambiguity and a receiver's position.

The receiver's position has been linear-approximated by using the estimation results of the passed receiver's positions. Applying a least square method to the regression equation, the integer ambiguity and the receiver's position is estimated.

12 Claims, 4 Drawing Sheets

U.S. PATENT DOCUMENTS 6,407,700 B1    6/2002    Giffard

FOREIGN PATENT DOCUMENTS

| JP | 7-128430 | 5/1995 |
| JP | 2002-517731 | 6/2002 |
| JP | 2003-216658 | 7/2003 |
| WO | 99/63358 A1 | 12/1999 |

OTHER PUBLICATIONS

Yamawaki, "Integration of Satellite Navigation Algorithm and It's Applicative Effect", Aeronautical and Space Science Japan, vol. 41, No. 475, 1993, pp. 472-481.

Van Dierendonck et al, "The GPS Navigation Message", Global Positioning System papers, Navigation, vol. 1, 1980, pp. 55-73.

Younes et al, "Improvements in GPS Integrity Monitoring for Non-Precision Sole Means of Navigation Using Hybrid GPS-INS", Proceedings of the 10$^{th}$ International Technical Meeting of the Satellite Division of the Institute of Navigation, 1997, pp. 509-518.

Sugimoto et al, "Carrier-Phase-Based Precise Point Positioning—A Novel Approach Based on GNSS Regression Models", The 2004 International Symposium on GNSS/GPS, 2004.

Supplementary EP Search Report completed Oct. 30, 2007 in corresponding EP application 05780938.7.

International Search Report for PCT/JP2005/015404 mailed Nov. 15, 2005.

Yamawaki, "Integration of Satellite Navigation Algorithm and Its Applicative Effect", Aeronautical and Space Science Japan, vol. 41, No. 475, pp. 472-481 (1993).

Van Dierendonck et al., "The GPS Navigation Message", Navigation, vol. 1, pp. 55-73 (1980).

Younes et al., "Improvements in GPS Integrity monitoring for non-precision sole means of navigation using hybrid GPS-INS, Proceeding of the 10$^{th}$ International Technical meeting of the Satellite Division of the Institute of Navigation", pp. 509-518 (1997).

INDEPENDENT POSITIONING DEVICE AND INDEPENDENT POSITIONING METHOD

This application is the U.S. national phase of international application PCT/JP2005/015404 filed 25 Aug. 2005, which designated the U.S. and claimed priority of JP 2004-244808 filed 25 Aug. 2004, the entire contents of each of which are hereby incorporated by reference.

TECHNICAL FIELD

The invention relates to point positioning apparatus and point positioning method configured to estimate a receiver's position by utilizing the satellite signals transmitted from the satellites.

BACKGROUND ART

Various types of a point positioning apparatus and method which estimate the point position utilizing the satellite signals of positioning from the satellites are disclosed. A basic positioning estimation of these apparatus is to introduce a nonlinear simultaneous equation comprising of a code pseudorange, a receiver's position in three dimensions, and a clock error of a receiver. And this estimation applied a Newton method, an extended Kalmann Filter to the nonlinear simultaneous equation. Applying to this estimation, various types of a method to eliminate an influence of an ionosphere and a troposphere are disclosed, too. One method set the delay of the ionosphere and the delay of the troposphere to "0" at initial condition. And the other method estimated these delay utilizing a phase difference, including single phase difference.

The Geodetic Society of Japan, [Shinteiban GPS—jinkoueisei niyoru seimitsusokuisisutemu—(in Japanese), A new edition GPS—A precise positioning system—], JAPAN ASSOCIATION OF SURVEYORS, Nov. 15, 1989, p. 121-140

DISCLOSURE OF THE INVENTION

A conventional point positioning apparatus and method utilizing the code pseudorange estimate the position by ignoring an actual delay of the ionosphere and an actual delay of the troposphere. The conventional point positioning apparatus and method had not estimated the point position until an estimation result had a satisfactory accuracy. Consequently the estimation result of the positioning varied widely, so we could not estimate the position with a high accuracy. Furthermore in the case of using the single phase difference with the code pseudorange, the delay data of the ionosphere, and the delay data of the troposphere, estimation result could have the high accuracy. But this estimation process was complicated, and the estimation result varied more widely under the influence of a threshpassed of noise after a estimation process with the single phase difference. Despite a complication of the estimation process, the estimation result could not be so high accuracy. And the complication of the estimation process made a processing speed very slow.

A feature of the invention is to provide a point positioning apparatus and method that estimates the receiver's position with a high accuracy and without the complication of the processing.

A point positioning apparatus of the invention estimates the distances between the receiver and the satellites respectively and estimates the receiver's position by utilizing these distances. A point positioning apparatus includes a satellite data observing device, an ionosphere data getting device, a troposphere data getting device, and a position estimating device. The satellite data observing device observes the orbits and the errors of the respective satellites by use of the navigation messages contained in the satellite signals or the values have been estimated off-line. The ionosphere data getting device gets the delay data of the ionosphere. The troposphere data getting device gets the delay data of the troposphere. The position estimating device estimates the receiver's position at least by means of applying a parameter estimation algorithm to a regression equation. The regression equation is comprised of the explanatory variables and the objective variables. The explanatory variables are an unknown values including of the receiver's position that calculated by a linear approximation utilizing previous estimation results and the orbits data of the satellites, an integer ambiguity, a clock error of the receiver, the clock errors of the satellites, the delays of the ionosphere, and the delays of the troposphere. The objective variables are the observable values including the carrier phases, the code pseudoranges, the clock errors of the satellites included in the navigation message, the delay data of the ionosphere, and the delay data of the troposphere.

A point positioning method of the invention estimates the distances between the receiver and the satellites respectively and estimates the receiver's position by utilizing these distances. A point positioning method includes a satellite data observing process, an ionosphere data getting process, a troposphere data getting process, and a position estimating process. The satellite data observing process is an observation of the orbits and the errors of the respective satellites by use of the navigation messages contained in the satellite signals or the values have been estimated off-line. The ionosphere data getting process is an acquisition of the delay data of the ionosphere. The troposphere data getting process is an acquisition of the delay data of the troposphere. The position estimating process is an estimation of the receiver's position at least by means of applying a parameter estimation algorithm to a regression equation. The regression equation is comprised of the explanatory variables and the objective variables. The explanatory variables are an unknown values including of the receiver's position that calculated by a linear approximation utilizing previous estimation results and the orbits data of the satellites, an integer ambiguity, a clock error of the receiver, the clock errors of the satellites, the delays of the ionosphere, and the delays of the troposphere. The objective variables are the observable values including of the carrier phase, the code pseudorange, the clock errors of the satellites included in the navigation message, the delay data of the ionosphere, and the delay data of the troposphere.

The point positioning apparatus and the positioning method set the carrier phases of every satellites and every carrier waves, the code pseudoranges of every satellites and every PN codes, the orbit data of every satellites, the clock error data of the every satellites, the delay data of the ionosphere, and the delay data of the troposphere as observable values. And the point positioning apparatus and point positioning method set the position of receiver in three dimensions, the clock error of the receiver, and the integer ambiguity of every carrier wave and every satellite as unknown value. The regression equation is composed of the observable values as objective variables and the unknown values as the explanatory variables. At this point, the receiver's position is linear estimated by the previous estimation results of the receiver's position and the orbit data of the every satellite. Applying the parameter estimation algorithm such as least-square method to a regression equation, the unknown values including at least the receiver's position could be estimated.

In an aspect of the invention, the point positioning apparatus and the point positioning method estimate the receiver's position by fixing the integer ambiguity with an integer ambiguity estimation method.

In this aspect, applying the integer ambiguity estimation method such as LAMBDA method to the integer ambiguity of the carrier phases, the integer ambiguity could be fixed as an integer value. By applying this fixed integer ambiguity to the regression equation, the amount of the unknown values could decrease and accuracy of the estimation result could improve.

In another aspect of the invention, the point positioning apparatus and the point positioning method memorize the carrier phases of every satellites, the code pseudoranges of every satellites, the clock error of the receiver, the orbit data of every satellites, the clock errors of every satellites, the delay data of the ionosphere, the delay date of the troposphere over the number of epochs.

In this aspect, getting the data over the number of epochs, the amount of the observable values and the unknown values would increase. But the amount of the observable values is more than one of the unknown values, so the unknown values of the regression equation could be estimated easier.

In another aspect of the invention, the point positioning apparatus and the point positioning method applies a state estimation algorithm to the regression equation.

In this aspect, applying the state estimation algorithm such as the Kalmann Filter and a nonlinear Filter to the regression equation described above, a position could be estimated while the receiver is moving.

In another aspect of the invention, the point positioning apparatus and the point positioning method add the orbit data of every satellites as the objective variable and the errors of the satellite's orbits as the explanatory variable into the regression equation. By using this regression equation the positioning apparatus and the positioning method estimates the receiver's position.

In this aspect of the invention, applying the error of the satellite's orbit which is related to a satellite's position as unknown value to the explanatory variable.

According to this invention, the estimation accuracy of the receiver's position and the integer ambiguity is high by utilizing the regression equation which comprising the delay data of the ionosphere, the delay data of the troposphere, the orbit data of the satellites, the clock error of the satellites, the carrier phases, the code pseudoranges as observational value, and the receiver's position; the integer ambiguity as unknown value. Accordingly, utilizing the easy estimation such as only one regression equation, the point position of the receiver is estimated with high accuracy.

In another aspect of the invention, applying the integer ambiguity estimation method such as LAMBDA method, estimating of the point position of the receiver has higher accuracy.

In another aspect of the invention, utilizing the observational variables over the number of epochs, the required number of the observational satellites is reduced and estimating the point position of the receiver has high accuracy.

In another aspect of the invention, applying the state estimation algorithm such as the Kalmann Filter, estimating the point position of the receiver which is moving has high accuracy.

In another aspect of the invention, utilizing the estimation equation comprising of the orbit data of the satellites as the observable value and the error of the satellite's orbit, the distance between the receiver and the satellites could be estimated with high accuracy. Accordingly, the receiver's position could be estimated with very high accuracy.

EXPLANATION OF REFERENCE NUMBERS

10 point positioning apparatus
11 a navigation message analysis device
12 a satellite information processing device
13 a point position operating device
20 a GPS antenna
30 a GPS receiver

THE BEST MODE FOR CARRYING OUT THE INVENTION

Figure 1:
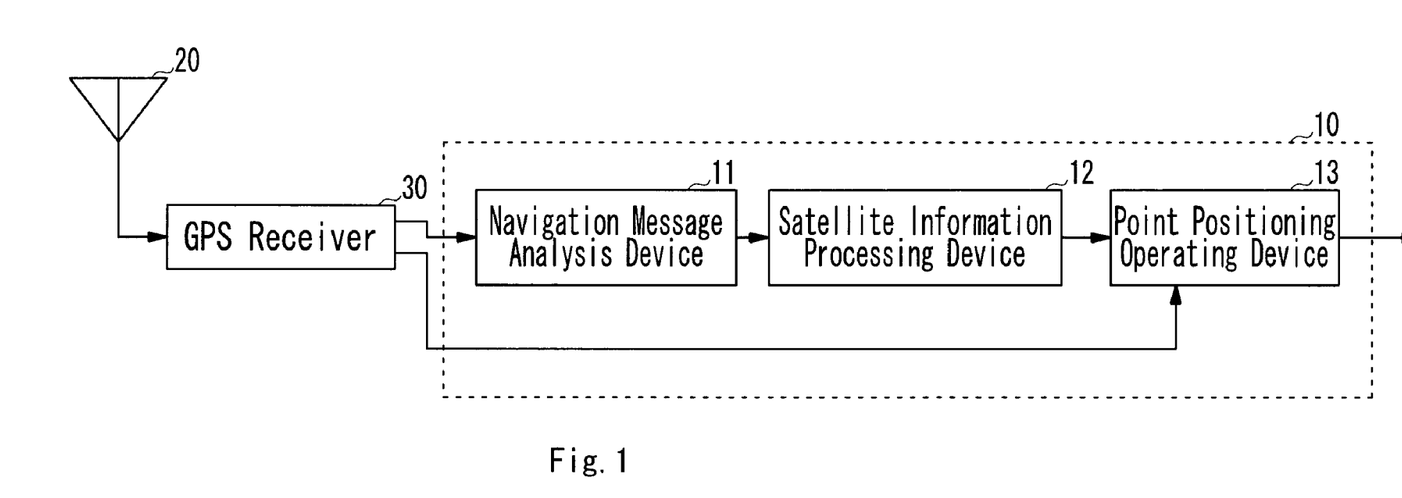
FIG. 1 is a block diagram illustrating an embodiment of the point positioning apparatus.
Figure 2:
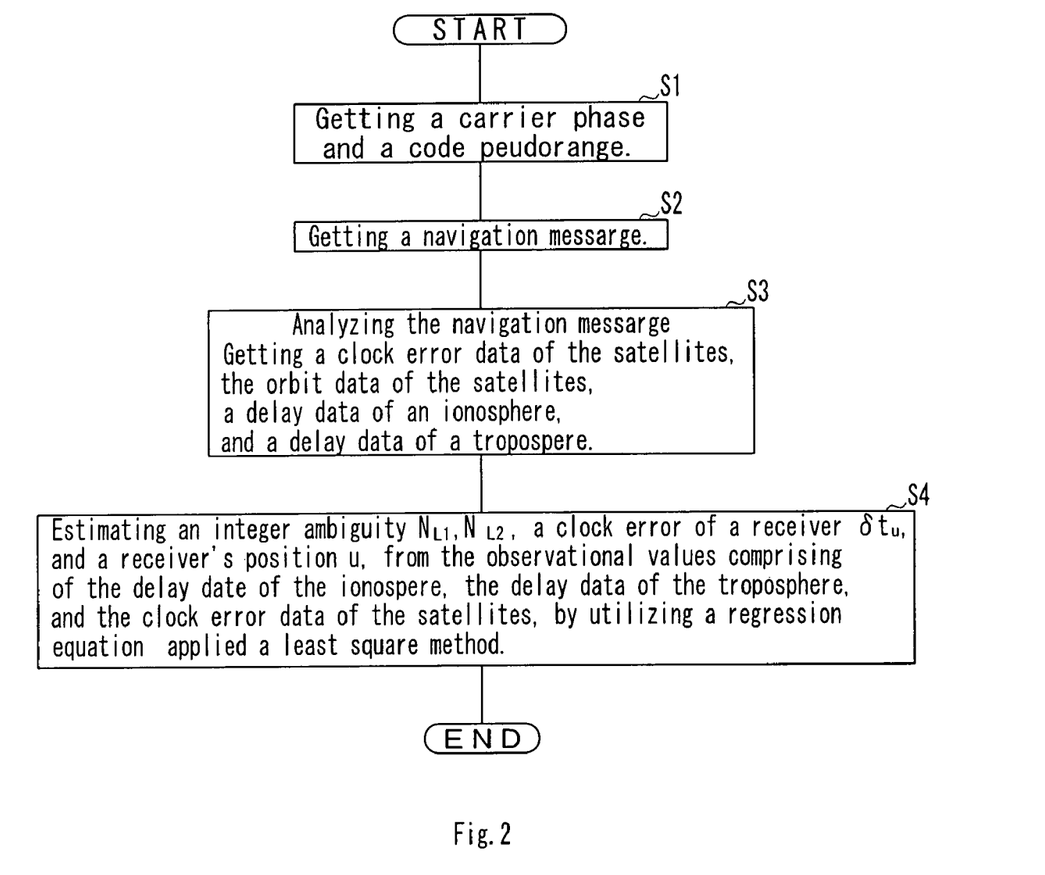
FIG. 2 is a flowchart illustrating an estimation process of a positioning system composed of the point positioning apparatus and a GPS receiver.

With reference to the accompanying drawings, an embodiment of the invention which is a point positioning apparatus will be described below. The following explanation of an embodiment explains GPS (Global Positioning System), but can apply to other all GNSS (Global Navigation Satellite System) FIG. 1 is a block diagram illustrating an embodiment of the point positioning apparatus. FIG. 2 is a flowchart illustrating an estimation process of a positioning system composed of the point positioning apparatus and a GPS receiver.

As shown FIG. 1, the point positioning apparatus connects to the GPS receiver 30, and includes a navigation message analysis device 11, a satellite information processing device 12, and a point position operating device 13.

The GPS receiver 30 connects to a antenna, and gets a L1 carrier phases, a L2 carrier phases, a pseudorange based on the C/A code, a pseudorange based on the P(Y) code, and a navigation message on L1 carrier by known method from the GPS satellite (S1, S2). The GPS receiver 30 outputs the navigation massage to the navigation massage analysis device 11. The GPS receiver 30 outputs the carrier phase and the code pseudorange (the pseudorange based on the C/A code and the pseudorange based on the P(Y) code) to the point position operating device 13.

The navigation message analysis device 11 gets a delay data of the ionosphere, the clock errors of the respective satellites, and the ephemeris data of the respective satellites by analyzing the navigation message inputted from the GPS receiver 30. The navigation message analysis device 11 gets a data of a troposphere by using the mathematical model. And the navigation message analysis device 11 outputs the each data to the satellite information processing device 12.

In reference to the ephemeris data, the satellite information processing device 12 chooses the GPS satellites utilized for estimating a receiver's position. The satellite information processing device 12 outputs to the chosen data. These chosen data have the ephemeris data, the clock delay of the satellite, the delay data of the ionosphere, and the delay data of the troposphere concerned with the chosen GPS satellites respectively (S3).

The point position operating device 13 formulates the observed positioning data consisting of the L1 carrier phase, the L2 carrier phase, the pseudorange based on the C/A code, the pseudorange based on the P(Y) code, the ephemeris data, a clock error of the GPS satellite, the delay data of the ionosphere, the delay data of the troposphere by a liner regression equation to described below. Applying a least-square method that is a kind of a parameter estimation algorithm to this linear regression equation, the point position operating device 13 estimates the receiver's position, an integer ambiguity NL1 of the L1 carrier wave, an integer ambiguity NL2 of the L2 carrier wave (S4). This estimation processing should be repeated until an error of the estimation result drops blow a predetermined threshpassed. When the error of the estimation result drops below the predetermined threshpassed, the estimation result of the receiver's position is outputted as an estimated receiver's position.

The navigation message analysis device 11, the satellite information processing device 12, and the point position operating device 13 are comprised of an arithmetic logical unit like a microprocessor which operates the algorithm described below. And these devices are comprised of the arithmetic logical units respectively or are comprised of the only arithmetic logical unit.

Next described below is a minute detail relating to an estimation algorithm which estimates the integer ambiguity of L1 carrier wave, the integer ambiguity of L2 carrier wave, and the receiver's position.

Generally an observation equation of a carrier phase $\phi_{pL,u}$ is described by an expression (1), and an observation equation of a code pseudorange $\rho_{pc,u}$ is described by an equation (2), where u is receiver, p is a satellite number (observable), L is a kind of a carrier wave, c is a kind of code. Meanwhile, an error of a multipath is too small to be ignored.

[Expression 1]

$$\varphi_{L,u}^p(t) = \frac{1}{\lambda_L}\left\{\begin{array}{l}r_u^p(t, t-\tau_u^p) - \delta I_u^p(t) + \\ \delta T_u^p(t) + c[\delta t_u(t) - \delta t^p(t-\tau_u^p)]\end{array}\right\} + N_{L,u}^p + \varepsilon_{L,u}^p(t) \quad (1)$$

$$\rho_{c,u}^p(t) = r_u^p(t, t-\tau_u^p) + \delta I_u^p(t) + \delta T_u^p(t) + c[\delta t_u(t) - \delta t^p(t-\tau_u^p)] + e_{c,u}^p(t) \quad (2)$$

where $\lambda_L$ is a wavelength of L carrier wave, $r_{pu}(t,t-\tau_{pu})$ is the geometric distance between the receiver u at the time t and the satellite p at the time $t-\tau_{pu}$. Thus $\tau_{pu}$ denotes the travel time from the satellite p to the receiver u. And where $\delta I_{pu}(t)$ is the delay of the ionosphere to the L1 carrier wave, $\delta T_{pu}(t)$ is the delay of the troposphere to the L1 and L2 carrier wave. $\delta t_u(t)$ is a clock error of receiver u in rue time t, $\delta t_p(t-\tau_{pu})$ is a clock error of GPS satellite p by time $(t-\tau_{pu})$. $N_{pL,u}$ is the integer ambiguity concerned with a distance between the receiver u and the GPS satellite p, $\epsilon p_{L,u}(t)$, $e_{pL,u}(t)$ are the observation noise respectively.

Therefore the observation equation of the L1 carrier phase $\phi_{pL1,u}$ is described by an expression (3), and the observation equation of L2 carrier phase $\phi_{pL2,u}$ is described by an expression (4).

[Expression 2]

$$\varphi_{L1,u}^p(t) = \frac{1}{\lambda_{L1}}\left\{r_u^{p'}(t, t-\tau_u^p) - \delta I_u^p(t) + \delta T_u^p(t) + c[\delta t_u(t) - \delta t^p(t-\tau_u^p)]\right\} + \quad (3)$$

$$N_{L1,u}^p + \varepsilon_{L1,u}^p(t)$$

$$\varphi_{L2,u}^p(t) = \frac{1}{\lambda_{L2}}\left\{r_u^p(t, t-\tau_u^p) - \frac{f_{L1}^2}{f_{L2}^2}\delta I_u^p(t) + \quad (4)\right.$$

$$\left.\delta T_u^p(t) + c[\delta t_u(t) - \delta t^p(t-\tau_u^p)]\right\} + N_{L2,u}^p + \varepsilon_{L2,u}^p(t)$$

where fL1 is a central frequency of the L1 carrier wave, fL2 is a central frequency of the L2 carrier wave.

Furthermore, the L1 carrier phase $\phi_{pL1,u}$ and the L2 carrier phase $\phi_{pL2,u}$ are described by an expression (3'), (4') respectively.

[Expression 3]

$$\Phi_{L1,u}^p(t) \equiv \lambda_{1,1}\varphi_{L1,u}^p(t) \quad (3')$$
$$= r_u^p(t, t-\tau_u^p) - \delta I_u^p(t) + \delta T_u^p(t) +$$
$$c[\delta t_u(t) - \delta t^p(t-\tau_u^p)] + \lambda_{L1}N_{L1,u}^p + \lambda_{L1}\varepsilon_{L1,u}^p(t)$$

$$\Phi_{L2,u}^p \equiv \lambda_{L2}\varphi_{L2,u}^p(t) \quad (4')$$
$$= r_u^p(t, t-\tau_u^p) - \frac{f_{L1}^2}{f_{L2}^2}\delta I_u^p(t) + \delta T_u^p(t) +$$
$$c[\delta t_u(t) - \delta t^p(t-\tau_u^p)] + \lambda_{L2}N_{L2,u}^p + \lambda_{L2}\varepsilon_{L2,u}^p(t)$$

The observation equation of the C/A code pseudorange $\rho_{pCA,u}$ is described by an expression (5), and the observation equation of P code $\rho_{pP,u}$ is described by an expression (6).

[Expression 4]

$$\rho_{CA,u}^p(t) = \quad (5)$$
$$r_u^p(t, t-\tau_u^p) + \delta I_u^p(t) + \delta T_u^p(t) + c[\delta t_u(t) - \delta t^p(t-\tau_u^p)] + e_{CA,u}^p(t)$$

$$\rho_{P,u}^p(t) = \quad (6)$$
$$r_u^p(t, t-\tau_u^p) + \frac{f_{L1}^2}{f_{L2}^2}\delta I_u^p(t) + \delta T_u^p(t) + c[\delta t_u(t) - \delta t^p(t-\tau_u^p)] + e_{P,u}^p(t)$$

At this point the geometric distance $r_{pu}(t,t-\tau_{pu})$ is described by an expression (7).

[Expression 5]

$$r_u^p(t) \equiv r_u^p(t, t-\tau_u^p) = \sqrt{\begin{array}{l}(x_u(t) - x^p(t-\tau_u^p))^2 + \\ (y_u(t) - y^p(t-\tau_u^p))^2 + (z_u(t) - z^p(t-\tau_u^p))^2\end{array}} \quad (7)$$

Next, we apply a Linear Taylor series expansion to an unknown receiver's position u(t) with a priori estimation of the receiver's position $u_{(j)}(t)$, and apply a linear approximation to the geometric distance $r_{pu}(t)$, then a following equation (an expression (9)) should be derived mathematically. At this point u(t) and $u_{(j)}(t)$ are defined by an following definitional equation respectively. $u(t)=[x_u(t), y_u(t), z_u(t)]^T$, $u^{(j)}(t)=[x_u^{(j)}(t), y_u^{(j)}(t), z_u^{(j)}(t)]^T$.

[Expression 6]

$$r_u^p \simeq r_{u(j)}^p + \left[\frac{\delta r_u^p}{\delta u}\right]_{u=u(j)}^T (u - u^{(j)}) \quad p = 1, 2, \ldots, n_s \quad (8)$$

where $$g^{p,(j)} \equiv \left[\frac{\delta r_{u(j)}^p}{\delta u^{(j)}}\right]^T \quad p = 1, 2, \ldots, n_s \quad (9)$$

By this expression (9), the expression (3'), (4'), (5), (6) are re-described to the following expression (10), (11), (12), (13) respectively.

[Expression 7]

$$\Phi_{L1,u}^{p,(j)} = r_{u(j)}^p + g^{p,(j)}(u - u^{(j)}) - \delta I_u^p + \delta T_u^p + c(\delta t_u - \delta t^p) + \lambda_{L1} N_{L1,u}^p + \lambda_{L1} \varepsilon_{L1,u}^p \quad (10)$$

$$\Phi_{L2,u}^{p,(j)} = r_{u(j)}^p + g^{p,(j)}(u - u^{(j)}) - \frac{f_{L1}^2}{f_{L2}^2}\delta I_u^p + \delta T_u^p + c(\delta t_u - \delta t^p) + \lambda_{L2} N_{L2,u}^p + \lambda_{L2} \varepsilon_{L2,u}^p \quad (11)$$

$$\rho_{CA,u}^{p,(j)} = r_{u(j)}^p + g^{p,(j)}(u - u^{(j)}) + \delta I_u^p + \delta T_u^p + c(\delta t_u - \delta t^p) + e_{CA,u}^p \quad (12)$$

$$\rho_{P,u}^{p,(j)} = r_{u(j)}^p + g^{p,(j)}(u - u^{(j)}) + \frac{f_{L1}^2}{f_{L2}^2}\delta I_u^p + \delta T_u^p + c(\delta t_u - \delta t^p) + e_{P,u}^p \quad (13)$$

At this point, a L1 carrier phase $\Phi e^{p,(j)}_{L1,u}$, a L2 carrier phase $\Phi e^{p,(j)}_{L2,u}$, a C/A code pseudorange $\rho e^{p,(j)}_{CA,u}$, a P code pseudorange $\rho e^{p,(j)}_{P,u}$ are defined by the following expression (14), (15), (16), (17) respectively.

[Expression 8]

$$\Phi e_{L1,u}^{p,(j)} \equiv \Phi_{L1,u}^{p,(j)} - \left(r_{u(j)}^p - g^{p,(j)} u^{(j)}\right) \quad (14)$$

$$\Phi e_{L2,u}^{p,(j)} \equiv \Phi_{L2,u}^{p,(j)} - \left(r_{u(j)}^p - g^{p,(j)} u^{(j)}\right) \quad (15)$$

$$\rho e_{CA,u}^{p,(j)} \equiv \rho_{CA,u}^{p,(j)} - r_{u(j)}^p + g^{p,(j)} u^{(j)} \quad (16)$$

$$\rho e_{P,u}^{p,(j)} \equiv \rho_{P,u}^{p,(j)} - r_{u(j)}^p + g^{p,(j)} u^{(j)} \quad (17)$$

By these expressions, the expression (10), (11), (12), (13) are re-described to the following expression (18), (19), (20), (21) respectively.

[Expression 9]

$$\Phi e_{L1,u}^{p,(j)} \cong g^{p,(j)} u - \delta I_u^p + \delta T_u^p + c(\delta t_u - \delta t^p) + \lambda_{L1} N_{L1,u}^p + \lambda_{L1} \varepsilon_{L1,u}^p \quad (18)$$

$$\Phi e_{L2,u}^{p,(j)} \cong g^{p,(j)} u - \frac{f_{L1}^2}{f_{L2}^2}\delta I_u^p + \delta T_u^p + c(\delta t_u - \delta t^p) + \lambda_{L2} N_{L2,u}^p + \lambda_{L2} \varepsilon_{L2,u}^p \quad (19)$$

$$\rho e_{CA,u}^{p,(j)} \cong g^{p,(j)} u + \delta I_u^p + \delta T_u^p + c[\delta t_u - \delta t^p] + e_{CA,u}^p \quad (20)$$

$$\rho e_{P,u}^{p,(j)} \cong g^{p,(j)} u + \frac{f_1^2}{f_2^2}\delta I_u^p + \delta T_u^p + c[\delta t_u - \delta t^p] + e_{P,u}^p \quad (21)$$

This equation denotes the approximate linear regression equation that is comprised of some explanatory variables and some objective variables. The objective variables are comprised of the carrier phases and the code pseudoranges. The explanatory variables are comprised of the receiver's position, the delay of the ionosphere, the delay of the troposphere, the integer ambiguity, and the measurement error.

Define a matrix $G^{(j)}$ as an expression (22) here.

[Expression 10]

$$G^{(j)} \equiv \begin{bmatrix} g^{1,(j)} \\ g^{2,(j)} \\ \vdots \\ g^{n_s,(j)} \end{bmatrix} \quad (22)$$

And a matrix $G^{(j)}_u$ is defined as an expression (23).

[Expression 11]

$$G_u^{(j)} = \begin{bmatrix} \frac{\delta r_{u(j)}^1}{\delta x_u^{(j)}} & \frac{\delta r_{u(j)}^{*1}}{\delta y_u^{(j)}} & \frac{\delta r_{u(j)}^{*1}}{\delta z_u^{(j)}} \\ \frac{\delta r_{u(j)}^2}{\delta x_u^{(j)}} & \frac{\delta r_{u(j)}^2}{\delta y_u^{(j)}} & \frac{\delta r_{u(j)}^2}{\delta z_u^{(j)}} \\ \vdots & \vdots & \vdots \\ \frac{\delta r_{u(j)}^{n_s}}{\delta x_u^{(j)}} & \frac{\delta r_{u(j)}^{n_s}}{\delta y_u^{(j)}} & \frac{\delta r_{u(j)}^{n_s}}{\delta z_u^{(j)}} \end{bmatrix} \quad (23)$$

$$\frac{\delta r_{u(j)}^p}{\delta x_u^{(j)}} = \frac{(x_u^{(j)} - x^p)}{r_{u(j)}^p}, \quad \frac{\delta r_{u(j)}^p}{\delta y_u^{(j)}} = \frac{(y_u^{(j)} - y^p)}{r_{u(j)}^p},$$

$$\frac{\delta r_{u(j)}^p}{\delta z_u^{(j)}} = \frac{(z_u^{(j)} - z^p)}{r_{u(j)}^p} \quad (p = 1, 2, \ldots, n_s)$$

Additionally define the L1 carrier phase $\Phi e^{p,(j)}_{L1,u}$, the L2 carrier phase $\Phi e^{p,(j)}_{L2,u}$, the C/A code pseudorange $\rho e^{p,(j)}_{CA,u}$, the P code pseudorange $\rho e^{p,(j)}_{P,u}$ as an expression (24) in matrix.

[Expression 12]

$$\Phi e_{L1,u}^{(j)} \equiv \begin{bmatrix} \Phi e_{L1,u}^{1,(j)} \\ \vdots \\ \Phi e_{L1,u}^{n_s,(j)} \end{bmatrix}, \Phi e_{L2,u}^{(j)} \equiv \begin{bmatrix} \Phi e_{L2,u}^{1,(j)} \\ \vdots \\ \Phi e_{L2,u}^{n_s,(j)} \end{bmatrix},$$

$$\rho e_{CA,u}^{(j)} \equiv \begin{bmatrix} \rho e_{CA,u}^{1,(j)} \\ \vdots \\ \rho e_{CA,u}^{n_s,(j)} \end{bmatrix}, \rho e_{P,u}^{(j)} \equiv \begin{bmatrix} \rho e_{P,u}^{1,(j)} \\ \vdots \\ \rho e_{P,u}^{n_s,(j)} \end{bmatrix} \quad (24)$$

By these expressions (22), (23), (24), the expression (18), (19), (20), (21) are re-described to the following expression (25) in a vector-matrix.

[Expression 13]

$$\begin{bmatrix} \Phi e_{L1,u}^{(j)} \\ \Phi e_{L2,u}^{(j)} \\ \rho e_{CA,u}^{(j)} \\ \rho e_{P,u}^{(j)} \end{bmatrix} = \begin{bmatrix} G_u^{(j)} & 1 & -I & -I & I & I & 0 \\ G_u^{(j)} & 1 & -I & -\frac{f_{L1}^2}{f_{L2}^2}I & I & 0 & I \\ G_u^{(j)} & 1 & -I & I & I & 0 & 0 \\ G_u^{(j)} & 1 & -I & \frac{f_{L1}^2}{f_{L2}^2}I & I & 0 & 0 \end{bmatrix} \begin{bmatrix} u \\ c\delta t_u \\ c\delta t^p \\ \delta I_u \\ \delta T_u \\ \lambda_{L1} N_{L1,u} \\ \lambda_{L2} N_{L2,u} \end{bmatrix} + \begin{bmatrix} \lambda_{L1} \varepsilon_{L1,u}^p \\ \lambda_{L2} \varepsilon_{L2,u}^p \\ e_{CA,u}^p \\ e_{P,u}^p \end{bmatrix} \quad (25)$$

or,

[Expression 14]

$$y_u^{(j)} = H^{(j)}\theta_u + v_u \quad (26)$$

$$y_u^{(j)} \equiv \begin{bmatrix} \Phi e_{L1,u}^{(j)} & \Phi e_{L2,u}^{(j)} & \rho e_{CA,u}^{(j)} & \rho e_{P,u}^{(j)} \end{bmatrix}^T \quad (27)$$

$$H_u^{(j)} \equiv \begin{bmatrix} G_u^{(j)} & 1 & -I & -I & I & I & 0 \\ G_u^{(j)} & 1 & -I & -\frac{f_{L1}^2}{f_{L2}^2}I & I & 0 & I \\ G_u^{(j)} & 1 & -I & I & I & 0 & 0 \\ G_u^{(j)} & 1 & -I & \frac{f_{L1}^2}{f_{L2}^2}I & I & 0 & 0 \end{bmatrix} \quad (28)$$

$$\theta_u \equiv [u \; c\delta t_u \; c\delta t^p \; \delta I_u \; \delta T_u \; \lambda_{L1} N_{L1,u} \; \lambda_{L2} N_{L2,u}]^T \quad (29)$$

$$v_u \equiv [\lambda_{L1}\varepsilon_{L1,u}^p \; \lambda_{L2}\varepsilon_{L2,u}^p \; e_{CA,u}^p \; e_{P,u}^p]^T \quad (30)$$

And now, described above, the navigation message includes the clock errors of each GPS satellite, so the navigation message analysis device 11 gets the clock errors of each GPS satellite from the navigation message. An observable value of these clock errors of the GPS satellites $\delta te^p$ is described by a following expression, and could be added to the regression equation described above.

$$\delta te^p = [0 \; 0 \; 1_{n_s} \; 0 \; 0 \; 0 \; 0]\theta_u + e_{\delta t^p} \quad \text{[Expression 15]}$$

Additionally, the delay of the ionosphere and the delay of the troposphere could be calculated from some kind of the GPS satellite information on the navigation message, applying one mathematical model calculates the delay data of the ionosphere and another mathematical model calculates the delay data of the troposphere. An observable value of the delay data of the ionosphere $\delta Ie_u$ and an observable of the delay data of the troposphere $\delta Te_u$ are described by following expressions respectively, and could be added to the regression equation described above.

$$\delta Ie_u = [0 \; 0 \; 1_{n_s} \; 0 \; 0 \; 0 \; 0]\theta_u + e_{\delta I_u}$$

$$\delta Te_u = [0 \; 0 \; 1_{n_s} \; 0 \; 0 \; 0 \; 0]\theta_u + e_{\delta T_u} \quad \text{[Expression 16]}$$

As a result, the objective variable of this linear regression equation, which is comprised of the carrier phase, the code pseudorange, the clock errors of the GPS satellites, the delay data of the ionosphere, and the delay data of the troposphere, is the observable value. And the explanatory variable of this linear regression equation, which includes the integer ambiguity and the receiver's position, is the unknown value.

Namely, the regression equation described by the expression (26) re-described by the following expressions (31), (32), (33), (34).

[Expression 17]

$$y_{u,E}^{(j)} = H_E^{(j)}\theta_u + v_{u,E} \quad (31)$$

$$y_{u,E}^{(j)} \equiv \begin{bmatrix} \Phi e_{L1,u}^{(j)} & \Phi e_{L2,u}^{(j)} & \rho e_{CA,u}^{(j)} & \rho e_{P,u}^{(j)} & \delta te^p & \delta Ie_u & \delta Te_u \end{bmatrix}^T \quad (32)$$

-continued $$H_E^{(j)} \equiv \begin{bmatrix} G_u^{(j)} & 1 & -I & -I & I & I & 0 \\ G_u^{(j)} & 1 & -I & -\frac{f_{L1}^2}{f_{L2}^2}I & I & 0 & I \\ G_u^{(j)} & 1 & -I & I & I & 0 & 0 \\ G_u^{(j)} & 1 & -I & \frac{f_{L1}^2}{f_{L2}^2}I & I & 0 & 0 \\ 0 & 0 & I & 0 & 0 & 0 & 0 \\ 0 & 0 & 0 & I & 0 & 0 & 0 \\ 0 & 0 & 0 & 0 & I & 0 & 0 \end{bmatrix} \quad (33)$$

$$v_{u,E} \equiv [\lambda_{L1}\varepsilon_{L1,u}^p \; \lambda_{L2}\varepsilon_{L2,u}^p \; e_{CA,u}^p \; e_{P,u}^p \; e_{\delta t^p} \; e_{\delta I_u} \; e_{\delta T_u}]^T \quad (34)$$

where $y^{(i)}_{u,E}$ is a vector-matrix of the objective variable, $H^{(j)}_E$ is a calculating matrix, $\theta_u$ is a vector-matrix of the explanatory variable, and $v_{u,E}$ is a vector-matrix of the error.

At this point, a covariance matrix of the error R based on the vector-matrix of the error $v_{u,E}$ is defined by a following expression (35).

[Expression 18]

$$R \equiv \text{Cov}[v_{u,E}] = \begin{bmatrix} \sigma_{\Phi 1}^2 I_{n_s} & 0 & 0 & 0 & 0 & 0 & 0 \\ 0 & \sigma_{\Phi 2}^2 I_{n_s} & 0 & 0 & 0 & 0 & 0 \\ 0 & 0 & \sigma_{CA}^2 I_{n_s} & 0 & 0 & 0 & 0 \\ 0 & 0 & 0 & \sigma_P^2 I_{n_s} & 0 & 0 & 0 \\ 0 & 0 & 0 & 0 & \sigma_{\delta t^p}^2 I_{n_s} & 0 & 0 \\ 0 & 0 & 0 & 0 & 0 & \sigma_{\delta I_u}^2 I_{n_s} & 0 \\ 0 & 0 & 0 & 0 & 0 & 0 & \sigma_{\delta T_u}^2 I_{n_s} \end{bmatrix} \quad (35)$$

where
$\sigma_{\Phi 1}^2 \equiv \lambda_{L1}^2 \sigma_{L1}^2$, $\sigma_{\Phi 2}^2 \equiv \lambda_{L2}^2 \sigma_{L2}^2$ Therefore, the estimated explanatory variable $\theta e^{(j+1)}$ which is a estimation of the explanatory variable $\theta^{(j+1)}$ is defined by a following expression (36).

$$\theta e^{(j+1)} = \{[H_E^{(j)}]^T R^{-1}[H_E^{(j)}]\}^{-1}[H_E^{(j)}]^T R^{-1} y_{u,E}^{(j)} \quad (36) \text{[Expression 19]}$$

Additionally a variance of the estimated explanatory variable $\theta e^{(j+1)}$ is defined by an following expression (37).

$$\text{Cov}[\theta e^{(j+1)}] = E[(\theta e^{(j+1)} - \theta)(\theta e^{(j+1)} - \theta)^T] = [[H_E^{(j)}]^T R^{-1} [H_E^{(j)}]]^{-1} \quad (37) \text{[Expression 20]}$$

As a reference to the calculated result of this expression (36), and applying a least-square method, the linear regression equation described above is calculated repeatedly. And the unknown values composing the explanatory variable $\theta$ converge, then the estimated values is determined by the converged values. At this point, a convergence condition of the unknown values composing the explanatory variable $\theta$ is what the variation (error) caused in the repeated calculation of estimating the unknown values drops blow the predetermined threshpassed. And then under this condition the estimation values composing the explanatory variable $\theta$ are determined. Utilizing the estimation operation described above, the integer ambiguity of L1 carrier wave $N_{L1}$, the integer ambiguity of L2 carrier wave $N_{L2}$, and the receiver's position could be estimated.

And according to the present embodiment, the integer ambiguity of L1 carrier wave NL1, the integer ambiguity of L2 carrier wave, and the receiver's position could be estimated without the estimation operation utilizing the single difference. As a consequence, we could estimate the point position of the receiver by using easier algorithm than the conventional one, and make an operation speed of the point positioning faster.

At this time using the estimation operation described above, the unknown values are the components of the explanatory variables $\theta_u$, and specifically the regression equation described by an expression (31) has some unknown parameters. The number of the unknown parameters is 3 in the receiver's position u, 1 in the clock error of the receiver $\delta t_u$, $n_s$ (equal to the number of the observable GPS satellite) in the clock errors of the GPS satellites $\delta t_p$, $n_s$ in the delay of the ionosphere $\delta I$, $n_s$ in the delay of the troposphere $\delta T$, $n_s$ in the integer ambiguity of the L1 carrier wave, and $n_s$ in the integer ambiguity of the L2 carrier wave, an amount of the unknown values is $4+5*n_s$.

On the other hand, the observable values is composed of the L1 carrier phase $\Phi e^{(j)}_{L1,u}$, the L2 carrier phase $\Phi e^{(j)}_{L2,u}$, the C/A code pseudorange $\rho e^{(j)}_{CA,u}$, the P(Y) code pseudorange $\rho e^{(j)}_{P,u}$, the clock error data of the GPS satellite $\delta te^p$, the delay data of the ionosphere $\delta Ie$, and the delay data of the troposphere $\delta Te$. The number of these observable values are $n_s$ that is a number of the observable GPS satellites, and an amount of the observable values is $7*n_s$.

In consequence, a required condition to solve the unknown values of this regression equation is the number of the unknown values $4+5*n_s$ is equal or less than the number of the observable values $7*n_s$ as the following expression.

$$4+5*n_s <= 7*n_s$$

This means $n_s >= 2$.

More specifically, it could be only 2 satellite signals from the respective GPS satellites to estimate the point position of the receiver. However, if we apply the least-square method to this regression equation described above, the inverse matrix of the $H^{(i)}_E$ in the expression (33) must exist.

But when the number of the observable GPS satellites $n_s$ is 2, this inverse matrix must be a single matrix. And when the number of the observable GPS satellites $n_s$ is 3, it has a large possibility that this inverse matrix would be a single matrix. Under this condition we could not have the inverse matrix. So we could not solve the unknown values of the regression equation described above.

This embodiment of invention described above use P code to execute the estimation operation, but P(Y) code is a secret code, so observing the P code pseudorange is very difficult in fact. Under this condition the observable value derived from the P(Y) code (include $n_s$ parameter) decreases, a required condition to solve the unknown values of this regression equation is following expression.

$$4+5*n_s <= 6*n_s$$

This means $n_s >= 4$. So it could be at least 4 satellite signals from the respective GPS satellites to estimate the point position of the receiver.

Following section describes the result of a simulation which is operated by this embodiment which is operated by this embodiment of the point positioning method. This result of the simulation is operated without utilizing the P code for the estimation equation.

Figure 3:
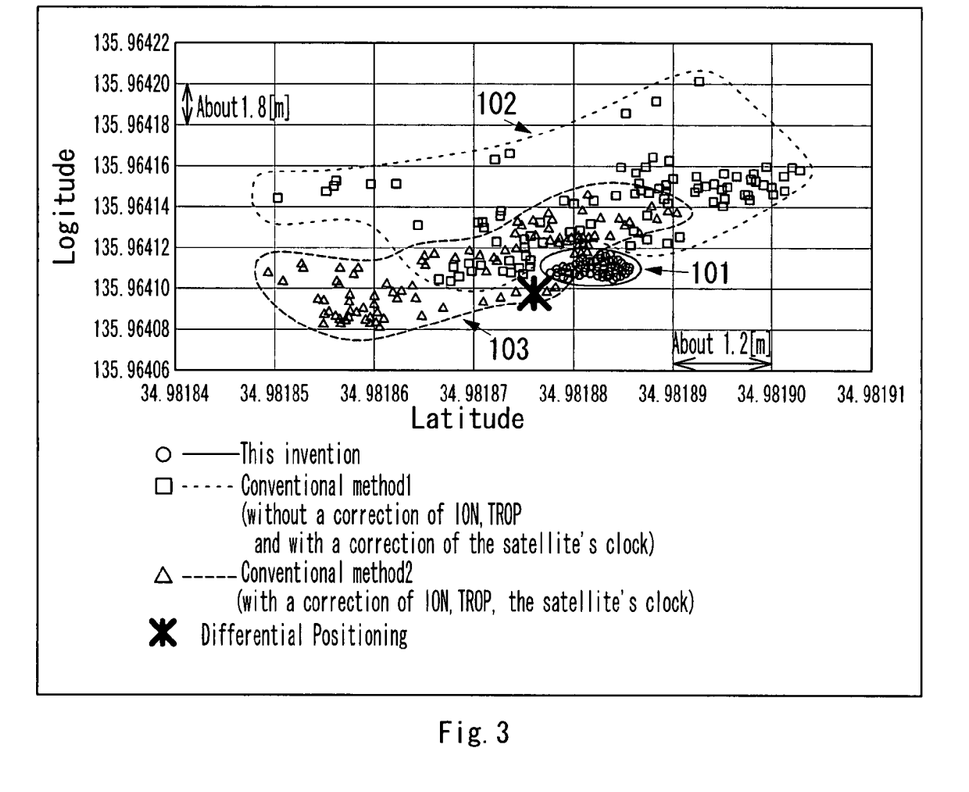
FIG. 3 is a scatter diagram of the receiver's position with an embodiment of the point positioning method.
Figure 4:
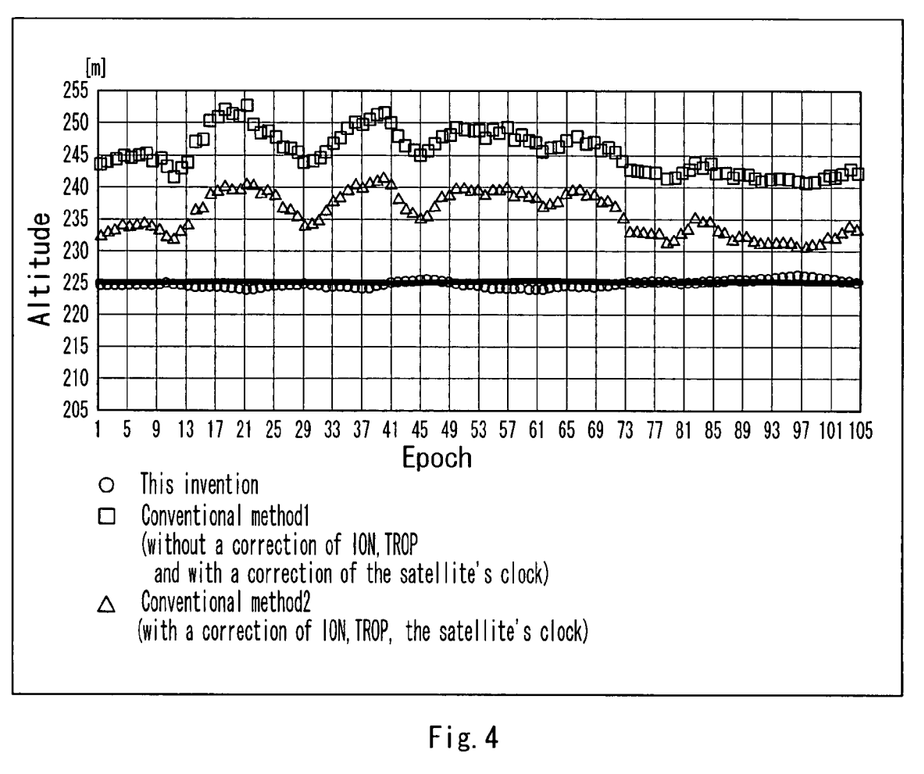
FIG. 4 is a diagram of the receiver's ellipsoid height with an embodiment of the point positioning method.

FIG. 3 is a scatter diagram of the receiver's position with an embodiment of the point positioning method. The receiver's position is plotted in two dimensions, a longitude and a latitude. FIG. 4 is a diagram of the receiver's ellipsoid height with an embodiment of the point positioning method.

A circuit plot shows an estimation result using this embodiment in FIGS. 3,4. And an area configured by a continuous line 101 contains all circle plots in FIG. 4. A quadrangle plot shows a consuetudinary estimation result only using the code pseudorange in FIGS. 3,4. And an area configured by a dotted line 102 contains almost quadrangle plots in FIG. 4. A triangle plot shows a consuetudinary estimation result using the code pseudorange, the delay data of the ionosphere, the delay data of the troposphere, and the clock error of the GPS satellite in FIGS. 3,4. And an area configured by dash line 103 contains almost triangle plots in FIG. 4. An asterisk plot in FIG. 3 and a continuous line in FIG. 4 show a relative positioning result.

And a table 1 shows an average and a standard deviation of the receiver's position (the longitude, the latitude, and the ellipsoid height) estimated by the point positioning method described above. A table 2 shows an average and a standard deviation of the receiver's position (the longitude, the latitude, and the ellipsoid height) estimated by the consuetudinary point positioning method only using the code pseudorange. A table 3 shows an average and a standard deviation of the receiver's position (the longitude, the latitude, and the ellipsoid height) estimated by the consuetudinary point positioning method using the code pseudorange, the delay data of the ionosphere, the delay data of the troposphere, and the clock error of the GPS satellite.

In this simulation, an initial value of the receiver's position is given the coordinate value described in RINEX DATA "APPROXPOSITIONXYZ". In addition, the delay data of the ionosphere is calculated applying what is called broadcasting model (Klobuchar model) to the data related to the delay of the ionosphere included in the navigation message.

The delay data of the troposphere is calculated applying a GPS satellite's elevation angle figured from the navigation message to a following equation.

[Expression 21]

$$\delta Te = \frac{2.47}{\sin\xi + 0.0121}[m]$$

where $\xi$ is an elevation angle.

The respective variances ($\sigma$) of the observation error are configured by 1.5 m at the code pseudorange, $\lambda/10+1.5/10$ m at the carrier phase, 3.6 m at the clock error of GPS satellite, 7.0 m at the delay of the ionosphere, and 0.7 m at the delay of the troposphere. On this simulation which estimates the receiver's position applying the least-square method, a calculation of the receiver's position should be operated repeatedly until a norm of a shift of the estimated receiver's position bellows $1*10^{-3}$ m.

TABLE 1

|  | Latitude | Longitude | Ellipsoid Height |
|---|---|---|---|
| Average | 34.98188223 [°] | 135.9641106 [°] | 224.93518 [°] |
| Standard Deviation | 0.195322465 [m] | 0.362454829 [m] | 0.526664731 [m] |
| Differential Positioning | 34.981876 [°] | 135.964098 [°] | 224.177 [°] |

TABLE 2

|  | Latitude | Longitude | Ellipsoid Height |
|---|---|---|---|
| Average | 34.98188284 [°] | 135.9641387 [°] | 245.547332 [°] |
| Standard Deviation | 1.419451503 [m] | 1.719274211 [m] | 3.161014416 [m] |
| Differential Positioning | 34.981876 [°] | 135.964098 [°] | 224.177 [°] |

TABLE 3

|  | Latitude | Logitude | Ellipsoid Height |
|---|---|---|---|
| Average | 34.98186963 [°] | 135.9641115 [°] | 236.1081403 [°] |
| Standard Deviation | 1.347937297 [m] | 1.572959303 [m] | 3.184914299 [m] |
| Differential Positioning | 34.981876 [°] | 135.964098 [°] | 224.177 [°] |

According to these results, the receiver's position estimated by the method of point positioning described above could be estimated preciously.

As described above, we could estimate the point position of the receiver by using easier algorithm than the consuetudinary one, and the point position estimated by using this embodiment could be more precise than the consuetudinary one.

Thus applying the least-square method to the estimation operation, a LMBDA method using the variance estimated from an expression (37) should be applied.

Accordingly, the L1 integer ambiguity and the L2 integer ambiguity are fixed, and the receiver's position could be estimated more precisely.

And on this embodiment described above there is the point positioning method utilizing the observed value at only one epoch. But the point positioning method utilizing the observed values for some epochs could be considered. Utilizing this method the point positioning apparatus has a memory memorized the carrier phases, the code pseudoranges, the ephemeris data, the clock errors of the GPS satellites, the delay of the ionosphere, and the delay data of the troposphere for each GPS satellite for some epochs.

Utilizing the observed values for some epochs, for example utilizing only C/A code, the number of the observed values for K epochs is a following expression.

$6*n_s*K=6K*n_s$

On the other hand at a kinematic point positioning the number of the observing epoch is plural, so the number of the unknown values (unknown parameters) except for the L1 integer ambiguity and the L2 integer ambiguity is increased in proportion to the number of the observing epochs. And the number of the unknown values is a following expression.

$4+5*n_s+(K-1)(4+3n_s)=4K+(3K+2)*n_s$

Therefore, the requirement to resolve the regression equation applying the least-square method is a following equation.

$6K*n_s>=4K+(3K+2)*n_s$ $(3K-2)*n_s>=4K$

Namely, $n_s>=4K/(3K-2)$

And in the case where the number of the epochs increases from 2 to infinity, calculating an integer available for us, the number $n_s$ of the GPS satellites is a following equation.

$n_s>=2$

Thus increasing the number of the satellites, we could operate the point positioning with observing at least 2 GPS satellites.

Furthermore applying the Kalmann Filter to the kinetic point positioning as described above, we could estimate the receiver's position more precisely. Next an estimation algorithm of the point positioning applied the Kalmann Filter is described below.

At first the expression (31) is re-described to a following expression (38) with using an observation time t corresponding to the order of epoch.

$$y_{u,E}^{(j)}(t)=H_E^{(j)}(t)\theta_u(t)+v_{u,E}(t) \qquad (38)[\text{Expression 22}]$$

t=1, 2, 3, ...

This expression (38) re-described to a following vector-matrix expression (39).

[Expression 23]

$$\begin{bmatrix} \Phi e_{L1,u}^{(j)}(t) \\ \Phi e_{L2,u}^{(j)}(t) \\ \rho e_{CA,u}^{(j)}(t) \\ \rho e_{P,u}^{(j)}(t) \\ c\delta t e^P(t) \\ \delta I e_u(t) \\ \delta T e_u(t) \end{bmatrix} = \begin{bmatrix} G_u^{(j)} & 1 & -I & -I & I & I & 0 \\ G_u^{(j)} & 1 & -I & -\frac{f_{L1}^2}{f_{L2}^2}I & I & 0 & I \\ G_u^{(j)} & 1 & -I & I & I & 0 & 0 \\ G_u^{(j)} & 1 & -I & \frac{f_{L1}^2}{f_{L2}^2}I & I & 0 & 0 \\ 0 & 0 & I & 0 & 0 & 0 & 0 \\ 0 & 0 & 0 & I & 0 & 0 & 0 \\ 0 & 0 & 0 & 0 & I & 0 & 0 \end{bmatrix} \begin{bmatrix} u(t) \\ c\delta t_u(t) \\ c\delta t^P(t) \\ \delta I_u(t) \\ \delta T_u(t) \\ \lambda_{L1} N_{L1,u} \\ \lambda_{L2} N_{L2,u} \end{bmatrix} + \begin{bmatrix} \lambda_{L1}\varepsilon_{L1,u}(t) \\ \lambda_{L2}\varepsilon_{L2,u}(t) \\ e_{CA,u}(t) \\ e_{P,u}(t) \\ e_{\delta t^P}(t) \\ e_{\delta I_u}(t) \\ e_{\delta T_u}(t) \end{bmatrix} \quad (39)$$

$t = 1, 2, 3, \ldots$

At this point the clock error of the GPS satellite multiplied the speed of light $c\delta t^P$, the delay of the ionosphere $\delta I_u$, and the delay of the troposphere $\delta T_u$ are defined by an expression (40a), an expression (40b), an expression (40c) respectively.

$$c\delta t^P(t) = c\delta t e^P(t) - e_{\delta t^P}(t) \quad (40a)$$

$$\delta I_u(t) = \delta I e_u(t) - e_{\delta I_u}(t) \quad (40b)$$

$$\delta T_u(t) = \delta T e_u(t) - e_{\delta T_u}(t) \quad (40c)\text{[Expression 24]}$$

These expression (40a-40c) are applied to the regression equation (39), furthermore, the observational vectors $y_{L1,u}^{(j)}(t)$, $y_{L2,u}^{(j)}(t)$, $y_{CA,u}^{(j)}(t)$, and $y_{P,u}^{(j)}(t)$ are defined by an following expression (41-44) respectively.

[Expression 25]

$$y_{L1,u}^{(j)} = \Phi e_{L1,u}^{(j)}(t) + c\delta t e^P(t) + \delta I e_u(t) - \delta T e_u(t) \quad (41)$$

$$y_{L2,u}^{(j)}(t) = \Phi e_{L2,u}^{(j)}(t) + c\delta t e^P(t) + \frac{f_{L1}^2}{f_{L2}^2}\delta I e_u(t) - \delta T e_u(t) \quad (42)$$

$$y_{CA,u}^{(j)}(t) = \rho e_{L1,u}^{(j)}(t) + c\delta t e^P(t) + \delta I e_u(t) - \delta T e_u(t) \quad (43)$$

$$y_{P,u}^{(j)}(t) = \rho e_{P,u}^{(j)}(t) + c\delta t e^P(t) + \frac{f_{L1}^2}{f_{L2}^2}\delta I e_u(t) - \delta T e_u(t) \quad (44)$$

A new regression equation is re-described to a following expression (45).

[Expression 26]

$$\begin{bmatrix} y_{L1,u}^{(j)}(t) \\ y_{L2,u}^{(j)}(t) \\ y_{CA,u}^{(j)}(t) \\ y_{P,u}^{(j)}(t) \end{bmatrix} = \begin{bmatrix} G_u^{(j)}(t) & 1 & I & 0 \\ G_u^{(j)}(t) & 1 & 0 & I \\ G_u^{(j)}(t) & 1 & 0 & 0 \\ G_u^{(j)}(t) & 1 & 0 & 0 \end{bmatrix} \begin{bmatrix} u(t) \\ c\delta t_u \\ \lambda_{L1} N_{L1,u} \\ \lambda_{L2} N_{L2,u} \end{bmatrix} + \begin{bmatrix} e_{\delta t^P}(t) + e_{\delta I_u}(t) - e_{\delta T_u}(t) + \lambda_{L1}\varepsilon_{L1,u} \\ e_{\delta t^P}(t) + \frac{f_{L1}^2}{f_{L2}^2}e_{\delta I_u}(t) - e_{\delta T_u}(t) + \lambda_{L2}\varepsilon_{L2,u} \\ e_{\delta t^P}(t) - e_{\delta I_u}(t) - e_{\delta T_u}(t) + e_{CA,u} \\ e_{\delta t^P}(t) - \frac{f_{L1}^2}{f_{L2}^2}e_{\delta I_u}(t) - e_{\delta T_u}(t)e_{P,u} \end{bmatrix} \quad (45)$$

At this point the Markov process model of the velocity of an unknown receiver's position u(t) and a clock error of the receiver $c\delta t_u(t)$ could be assumed, and a new state vector $\eta_{u(t)}$ is defined by an following expression (46).

[Expression 27]

$$\eta_u(t) = \begin{bmatrix} u(t) \\ v(t) \\ c\delta t_u \\ N_{L1,u} \\ N_{L2,u} \end{bmatrix} \quad (46)$$

And for this state vector $\eta_{u(t)}$ a new state equation described by a following expression (47) is configured.

$$\eta_u(t+1) = A\eta_u(t) + Bw(t) \quad (47)\text{[Expression 28]}$$

Additionally the observation equation described by the expression (45) re-describes to a following expression (48).

[Expression 29]

$$\begin{bmatrix} y_{L1,u}^{(j)}(t) \\ y_{L2,u}^{(j)}(t) \\ y_{CA,u}^{(j)}(t) \\ y_{P,u}^{(j)}(t) \end{bmatrix} = \begin{bmatrix} G_u^{(j)}(t) & 0 & 1 & \lambda_{L1} I & 0 \\ G_u^{(j)}(t) & 0 & 1 & 0 & \lambda_{L2} I \\ G_u^{(j)}(t) & 0 & 1 & 0 & 0 \\ G_u^{(j)}(t) & 0 & 1 & 0 & 0 \end{bmatrix} \begin{bmatrix} u(t) \\ v(t) \\ c\delta t_u \\ \lambda_{L1} N_{L1,u} \\ \lambda_{L2} N_{L2,u} \end{bmatrix} + \begin{bmatrix} e_{\delta t^P}(t) + e_{\delta I_u}(t) - e_{\delta T_u}(t) + \lambda_{L1}\varepsilon_{L1,u} \\ e_{\delta t^P}(t) + \frac{f_{L1}^2}{f_{L2}^2}e_{\delta I_u}(t) - e_{\delta T_u}(t) + \lambda_{L2}\varepsilon_{L2,u} \\ e_{\delta t^P}(t) - e_{\delta I_u}(t) - e_{\delta T_u}(t) + e_{CA,u} \\ e_{\delta t^P}(t) - \frac{f_{L1}^2}{f_{L2}^2}e_{\delta I_u}(t) - e_{\delta T_u}(t)e_{P,u} \end{bmatrix} \quad (48)$$

This observation equation re-describes to an following vector-matrix expression (49).

$$y_{u,R}^{(j)}(t) = C_u^{(j)}(t)\eta_u(t) + v_{u,R}(t) \quad (49)\text{[Expression 30]}$$

t=1, 2, . . .

Namely, it means these expression (47), (48), (49) constitute the Kalmann Filter. At this point the covariance matrix vu,R(t) could be configured as the expression (35). And utilizing the state equation described by the expression (47) and the observation equation described by the expression (48), even if the receiver moves, the estimation of the receiver's position could be operated.

According to the embodiment described above, even if the receiver moves, we could estimate the receiver's position precisely with estimating the movement of the receiver by the Kalmann Filter.

Meanwhile, in the embodiment described above, a GPS satellite's position is not estimated. But utilizing a following method (algorithm), the GPS satellite's position could be estimated.

At first the distance from the receiver to the GPS satellite is defined. And when both the GPS satellite's position and the receiver's position would be estimated, the linear approximation of the receiver's position could be described below.

[Expression 31]

$$\frac{\delta r_u^p}{\delta x_u} = \frac{(x_u - x^p)}{r_u^p},$$

$$\frac{\delta r_u^p}{\delta y_u} = \frac{(y_u - y^p)}{r_u^p},$$

$$\frac{\delta r_u^p}{\delta z_u} = \frac{(z_u - z^p)}{r_u^p}$$

$$(p = 1, 2, \ldots, n_s)$$

The linear approximation of the GPS satellite's position could be described

[Expression 32]

$$\frac{\delta r_u^p}{\delta x^p} = -\frac{(x_u - x^p)}{r_u^p},$$

$$\frac{\delta r_u^p}{\delta y^p} = -\frac{(y_u - y^p)}{r_u^p},$$

$$\frac{\delta r_u^p}{\delta z^p} = -\frac{(z_u - z^p)}{r_u^p}$$

$$(p = 1, 2, \ldots, n_s)$$

And when each satellite's position is defined as $sp = [x^p, y^p, z^p]^T$, following equation is effected.

[Expression 33]

$$\frac{\delta r_u^p}{\delta u} = -\frac{\delta r_u^p}{\delta s^p}$$

Thus, an estimation value of the receiver's position u and the GPS satellite's position $s^p$ are approximated as a following expression (50) by the linear Taylor series expansion using the observation value of the receiver's position $u^{(j)}$ and the GPS satellite's position $se_p$.

[Expression 34]

$$r_u^p \cong r_{u(j)}^p + \left[\frac{\delta r_u^p}{\delta u}\right]_{u-u(j), s^p-se^p}^T [u - s^p - (u^{(j)} - se^p)] \quad (50)$$

$$(p = 1, 2, \ldots, n_s)$$

Consequently, the expressions (10), (11), (12), (13) are reconfigured to the following expressions (51), (52), (53), (54) respectively.

Expression 35

$$\Phi_{L1,u}^{p,(j)} = r_{u(j)}^p + g^{p,(j)}[u - s^p - (u^{(j)} - se^p)] - \delta 1_u^p + \quad (51)$$
$$\delta T_u^p + c(\delta t_u - \delta t^p) + \lambda_{L1} N_{L1,u}^p + \lambda_{L1} \varepsilon_{L1,u}^p$$

$$\Phi_{L2,u}^{p,(j)} = r_{u(j)}^p + g^{p,(j)}[u - s^p - (u^{(j)} - se^p)] - \frac{f_{L1}^2}{f_{L2}^2} \delta 1_u^p + \quad (52)$$
$$\delta T_u^p + c(\delta t_u - \delta t^p) + \lambda_{L2} N_{L2,u}^p + \lambda_{L2} \varepsilon_{L2,u}^p$$

$$\rho_{CA,u}^{p,(j)} = r_{u(j)}^p + g^{p,(j)}[u - s^p - (u^{(j)} - se^p)] + \quad (53)$$
$$\delta I_u^p + \delta T_u^p + c(\delta t_u - \delta t^p) + e_{CA,u}^p$$

$$\rho_{P,u}^{p,(j)} = r_{u(j)}^p + g^{p,(j)}[u - s^p - (u^{(j)} - se^p)] + \frac{f_{L1}^2}{f_{L2}^2} \delta I_u^p + \quad (54)$$
$$\delta T_u^p + c(\delta t_u - \delta t^p) + e_{P,u}^p$$

At this point the observational L1 carrier phase $\Phi e^{p,(j)}_{L1,u}$, the observational L2 carrier phase $\Phi e^{p,(j)}_{L2,u}$, the observational C/A code pseudorange $\rho e^{p,(j)}_{CA,u}$, and the observational P code pseudorange $\rho e^{p,(j)}_{P,u}$ are redefined to a following expressions (55), (56), (57), (58) respectively.

[Expression 36]

$$\Phi e_{L1,u}^{p,(j)} \equiv \Phi_{L1,u}^{p,(j)} - \left[r_{u(j)}^p - g^{p,(j)}(u^{(j)} - se^p)\right] \quad (55)$$

$$\Phi e_{L2,u}^{p,(j)} \equiv \Phi_{L2,u}^{p,(j)} - \left[r_{u(j)}^p - g^{p,(j)}(u^{(j)} - se^p)\right] \quad (56)$$

$$\rho e_{CA,u}^{p,(j)} \equiv \rho_{CA,u}^{p,(j)} - \left[r_{u(j)}^p - g^{p,(j)}(u^{(j)} - se^p)\right] \quad (57)$$

$$\rho e_{P,u}^{p,(j)} \equiv \rho_{P,u}^{p,(j)} - \left[r_{u(j)}^p - g^{p,(j)}(u^{(j)} - se^p)\right] \quad (58)$$

Thus the expressions (51), (52), (53), (54) are re-described to an expression (59), (60), (61), (62) respectively.

[Expression 37]

$$\Phi e_{L1,u}^{p,(j)} \cong g^{p,(j)} u - g^{p,(j)} s^p - \delta I_u^p + \delta T_u^p + \quad (59)$$
$$c(\delta t_u - \delta t^p) + \lambda_{L1} N_{L1,u}^p + \lambda_{L1} \varepsilon_{L1,u}^p$$

$$\Phi e_{L2,u}^{p,(j)} \cong g^{p,(j)} u - g^{p,(j)} s^p - \frac{f_{L1}^2}{f_{L2}^2} \delta I_u^p + \delta T_u^p + \quad (60)$$
$$c(\delta t_u - \delta t^p) + \lambda_{L2} N_{L2,u}^p + \lambda_{L2} \varepsilon_{L2,u}^p$$

$$\rho e_{CA,u}^{p,(j)} \cong g^{p,(j)} u - g^{p,(j)} s^p + \delta I_u^p + \delta T_u^p + c[\delta t_u - \delta t^p] + e_{CA,u}^p \quad (61)$$

$$\rho e_{P,u}^{p,(j)} \cong g^{p,(j)} u - g^{p,(j)} s^p + \frac{f_1^2}{f_2^2} \delta I_u^p + \delta T_u^p + c[\delta t_u - \delta t^p] + e_{P,u}^p \quad (62)$$

The observational L1 carrier phase $\Phi e^{p,(j)}_{L1,u}$, the observational L2 carrier phase $\Phi e^{p,(j)}_{L2,u}$, the observational C/A code pseudorange $\rho e^{p,(j)}_{CA,u}$, and the observational P code pseudorange $\rho e^{p,(j)}_{P,u}$ are redefined to a following expressions respectively.

[Expression 138]

$$\Phi e_{L1,u}^{s,(j)} \equiv \begin{bmatrix} \Phi e_{L1,u}^{1,(j)} \\ \vdots \\ \Phi e_{L1,u}^{n_s,(j)} \end{bmatrix}, \Phi e_{L2,u}^{s,(j)} \equiv \begin{bmatrix} \Phi e_{L2,u}^{1,(j)} \\ \vdots \\ \Phi e_{L2,u}^{n_s,(j)} \end{bmatrix},$$

$$\rho e_{CA,u}^{s,(j)} \equiv \begin{bmatrix} \rho e_{CA,u}^{1,(j)} \\ \vdots \\ \rho e_{CA,u}^{n_s,(j)} \end{bmatrix}, \rho e_{P,u}^{s,(j)} \equiv \begin{bmatrix} \rho e_{P,u}^{1,(j)} \\ \vdots \\ \rho e_{P,u}^{n_s,(j)} \end{bmatrix}$$

Consequently, the expressions (59), (60), (61), (62) are re-described to the vector-matrix as a following expression (63).

[Expression 39]

$$\begin{bmatrix} \Phi e_{L1,u}^{(j)} \\ \Phi e_{L2,u}^{(j)} \\ \rho e_{CA,u}^{(j)} \\ \rho e_{P,u}^{(j)} \end{bmatrix} = \begin{bmatrix} G_u^{(j)} & 1 & -G_{D,u}^{(j)} & -I & -I & I & I & 0 \\ G_u^{(j)} & 1 & -G_{D,u}^{(j)} & -I & -\frac{f_{L1}^2}{f_{L2}^2}I & I & 0 & I \\ G_u^{(j)} & 1 & -G_{D,u}^{(j)} & -I & I & I & 0 & 0 \\ G_u^{(j)} & 1 & -G_{D,u}^{(j)} & -I & \frac{f_{L1}^2}{f_{L2}^2}I & I & 0 & 0 \end{bmatrix} \begin{bmatrix} u \\ c\delta t_u \\ s \\ c\delta t^s \\ \delta I_u \\ \delta T_u \\ \lambda_{L1} N_{L1,u} \\ \lambda_{L2} N_{L2,u} \end{bmatrix} + \begin{bmatrix} \lambda_{L1}\varepsilon_{L1,u} \\ \lambda_{L2}\varepsilon_{L2,u} \\ e_{CA,u} \\ e_{P,u} \end{bmatrix}$$ (63)

where $$G_{D,u}^{(j)} \equiv \begin{bmatrix} g^{1,(j)} & 0 & \cdots & 0 \\ 0 & g^{2,(j)} & 0 & \vdots \\ \vdots & \cdots & \cdots & 0 \\ 0 & 0 & \cdots & 0 & g^{n_s,(j)} \end{bmatrix} (n_s \times 3n_s \text{ matrix})$$

An observation vector sk of the satellite with a precise orbit is defined to an following expression.

$$sk = s + e_s, \ s = [(s^1)^T, (s^1)^T, \Lambda, (s^1)^T]T, \ 3n_s \times 1 \quad \text{[Expression 40]}$$

Applying this expression to the expression (63), the expression (64) is derived.

[Expression 41]

$$\begin{bmatrix} \Phi e_{L1,u}^{(j)}(t) \\ \Phi e_{L2,u}^{(j)}(t) \\ \rho e_{CA,u}^{(j)}(t) \\ \rho e_{P,u}^{(j)}(t) \\ sk(t) \\ c\delta t e^s(t) \\ \delta I e_u(t) \\ \delta T e_u(t) \end{bmatrix} = \begin{bmatrix} G_u^{(j)}(t) & 1 & -G_{D,u}^{(j)}(t) - I & -I & & I & I & 0 \\ G_u^{(j)}(t) & 1 & -G_{D,u}^{(j)}(t) - I & -\frac{f_{L1}^2}{f_{L1}^2} & & I & 1 & 0 & I \\ G_u^{(j)}(t) & 1 & -G_{D,u}^{(j)}(t) - I & & I & & I & 0 & 0 \\ G_u^{(j)}(t) & 1 & -G_{D,u}^{(j)}(t) - I & -\frac{f_{L1}^2}{f_{L2}^2} & & I & 1 & 0 & 0 \\ 0 & 0 & & I & & 0 & 0 & 0 & 0 \\ 0 & 0 & & 0 & & I & 0 & 0 & 0 \\ 0 & 0 & & 0 & & 0 & I & 0 & 0 \end{bmatrix} \begin{bmatrix} u(t) \\ c\delta t_u(t) \\ s(t) \\ c\delta t^s(t) \\ \delta I_u(t) \\ \delta T_u(t) \\ \lambda_{L1} N_{L1,u} \\ \lambda_{L2} N_{L2,u} \end{bmatrix} + \begin{bmatrix} \lambda_{L1}\varepsilon_{L2,u}(t) \\ \lambda_{L2}\varepsilon_{L2,u}(t) \\ e_{CA,u}(t) \\ e_{P,u}(t) \\ e_s(t) \\ e_{\delta t^s}(t) \\ e_{\delta I_u}(t) \\ e_{\delta T_u}(t) \end{bmatrix}$$ (64)

Utilizing the regression equation described above, we could estimate the GPS satellite's position precisely. And estimating the GPS satellite position precisely, we could estimate the receiver's position more precisely.

Furthermore, utilizing a following algorithm, we could apply the Kalmann Filter to the regression equation, too.

Namely, the state vector s, the clock errors of the GPS $c\delta t^p$, the delay of the ionosphere $\delta I_u$, the delay of the troposphere $\delta T_u$ are defined the following expressions (65a), (65b), (65c), (65d) respectively.

$$s(t) = sk(t) - e_s(t) \quad (65a)$$

$$c\delta t^p(t) = c\delta t e^p(t) - e_{\delta t^p}(t) \quad (65b)$$

$$\delta I_u(t) = \delta I e_u(t) - e_{\delta I_u}(t) \quad (65c)$$

$$\delta T_u(t) = \delta T e_u(t) - e_{\delta T_u}(t) \quad (65d) \text{[Expression 42]}$$

These expressions are applied to the regression equation (64). Furthermore the observational vectors $y^{(j)}_{L1,u}(t)$, $y^{(j)}_{L2,u}(t)$, $y^{(j)}_{CA,u}(t)$, and $y^{(j)}_{P,u}(t)$ are defined by a following expressions (66), (67), (68), (69) respectively.

[Expression 43]

$$y_{L1,u}^{(j)}(t) = \Phi e_{L1,u}^{(j)}(t) + G_{D,u}^{(j)}(t)sk(t) + c\delta t e^p(t) + \delta I e_u(t) - \delta T e_u(t) \quad (66)$$

$$y_{L2,u}^{(j)}(t) = \Phi e_{L2,u}^{(j)}(t) + G_{D,u}^{(j)}(t)sk(t) + c\delta t e^p(t) + \frac{f_{L1}^2}{f_{L2}^2}\delta I e_u(t) - \delta T e_u(t) \quad (67)$$

$$y_{CA,u}^{(j)}(t) = \rho e_{L1,u}^{(j)}(t) + G_{D,u}^{(j)}(t)sk(t) + c\delta t e^p(t) - \delta I e_u(t) - \delta T e_u(t) \quad (68)$$

$$y_{P,u}^{(j)}(t) = \rho e_{P,u}^{(j)}(t) + G_{D,u}^{(j)}(t)sk(t) + c\delta t e^p(t) - \frac{f_{L1}^2}{f_{L2}^2}\delta I e_u(t) - \delta T e_u(t) \quad (69)$$

Consequently a new regression equation is described as an expression (70).

[Expression 44]

$$\begin{bmatrix} y_{L1,u}^{(j)}(t) \\ y_{L2,u}^{(j)}(t) \\ y_{Ca,u}^{(j)}(t) \\ y_{P,u}^{(j)}(t) \end{bmatrix} = \begin{bmatrix} G_u^{(j)}(t) & 1 & I & 0 \\ G_u^{(j)}(t) & 1 & 0 & I \\ G_u^{(j)}(t) & 1 & 0 & 0 \\ G_u^{(j)}(t) & 1 & 0 & 0 \end{bmatrix} \begin{bmatrix} u(t) \\ c\delta t_u \\ \lambda_{L1} N_{L1,u} \\ \lambda_{L2} N_{L2,u} \end{bmatrix} + \quad (70)$$

$$\begin{bmatrix} G_{D,u}^{(j)} e_s(t) + e_{\delta t^P}(t) + e_{\delta1_u}(t) - e_{\delta T_u}(t) + \lambda_{L1} \varepsilon_{L1,u} \\ G_{D,u}^{(j)} e_s(t) + e_{\delta t^P}(t) + \frac{f_{L1}^2}{f_{L2}^2} e_{\delta1_u}(t) - e_{\delta T_u}(t) + \lambda_{L2} \varepsilon_{L2,u} \\ G_{D,u}^{(j)} e_s(t) + e_{\delta t^P}(t) - e_{\delta1_u}(t) - e_{\delta T_u}(t) + e_{CA,u} \\ G_{D,u}^{(j)} e_s(t) + e_{\delta t^P}(t) - \frac{f_{L1}^2}{f_{L2}^2} e_{\delta1_u}(t) - e_{\delta T_u}(t) + e_{P,u} \end{bmatrix}$$

And defining the state equation to this observational equation (a new regression equation), the Kalmann Filter could be configured.

Meanwhile, in this embodiment described above, the delay of the ionosphere and the delay of the troposphere are estimated at the receiver. But the base station whose position is known and fixed exist, the delay of the ionosphere and the delay of the troposphere could be estimated at the base station using the method described above. And giving the delay of the ionosphere and the delay of the troposphere estimated at base station, and more the error of the satellite orbit and the clock error of the GPS satellite estimated at base station to the receiver, at the receiver we could estimate the receiver's position more precisely.

Additionally, with the embodiment described above, the least-square method is applied to the linear regression equation, but the other estimation algorithm of the parameter could be applied.

And with the embodiment described above, the linear Taylor series expansion is applied to the linear approximation of the receiver's position, but the other expression of the linear approximation could be applied.

And with the embodiment described above, the LAMBDA method is applied to the linear regression equation, but the other estimation algorithm to fix an integer ambiguity could be applied.

And with the embodiment described above, the Kalmann Filter is applied to the linear regression equation, but the other estimation algorithm of condition could be applied.

The invention claimed is:

1. A point positioning apparatus which estimates distances between a receiver and satellites and a position of the receiver by utilizing satellite signals transmitted from the satellites, comprising:
    a satellite data observing device which observes orbit data of the satellites and clock errors of the satellites from a navigation message included in the satellites signals or estimated values by off-line processing;
    an ionosphere data getting device which gets delay data of an ionosphere;
    a troposphere data getting device which gets delay data of troposphere; and
    a position estimating device which:
        linear-approximates the position of the receiver by using the estimation results of previous positions of the receiver and the orbit data of the satellites,
        sets up explanatory variables, as unknown values, that include the linear-approximated position of the receiver, an integer ambiguity, a clock error of the receiver, clock errors of the satellites, delays of the ionosphere, delays of the troposphere,
        sets up objective variables, as observational values, that include carrier phases, code pseudoranges, clock error data of the satellites, delay data of the ionosphere, delay data of the troposphere,
        sets a regression equation of the explanatory variables and the objective variables, and
        estimates at least the position of the receiver by applying a parameter estimation algorithm to the regression equation.

2. The point positioning apparatus according to claim 1, wherein the position estimating device estimates the position of the receiver by fixing the integer ambiguity by an integer ambiguity estimation method.

3. The point positioning apparatus according to claim 1, further comprising a temporary memory device which memorizes the carrier phases, the code pseudoranges, the clock error of the receiver, the orbit data of the satellites, the clock error data of the satellites, the delay data of the ionosphere, the delay data of the troposphere over the number of epochs,
wherein the position estimating device sets the regression equation of every data got over the number of epochs.

4. The point positioning apparatus according to claim 1, wherein the position estimating device applies a state estimation algorithm to the regression equation.

5. The point positioning apparatus according to claim 1, wherein:
    the position estimating device estimates position of the satellites by utilizing the regression equation;
    the objective variables further include the orbit data of the satellites; and
    the explanatory variables further include errors of the satellite's orbits.

6. A point positioning method for estimating distance between a receiver and satellites and a position of the receiver by utilizing satellite signals transmitted from the satellites, comprising the step of:
    observing orbit data of the satellites and clock errors of the satellites from a navigation message included in satellite signals or estimated values by off-line processing;
    getting delay data of an ionosphere and delay data of a troposphere;
    linear-approximating the position of the receiver by using the estimation results of previous position of the receiver and the orbit data of the satellites;
    setting up explanatory variables, as unknown values, that include the linear-approximated position of the receiver, an integer ambiguity, a clock error of the receiver, clock errors of the satellites, delays of the ionosphere, delays of the troposphere;
    setting up objective variables, as observational values, that include carrier phases, code pseudoranges, clock error data of the satellites, delay data of the ionosphere, delay data of the troposphere;
    setting a regression equation of the explanatory variables and the objective variables; and estimating at least the position of the receiver by applying a parameter estimation algorithm to the regression equation.

7. The point positioning method according to claim 6, wherein the position of the receiver is estimated by fixing the integer ambiguity by an integer ambiguity estimation method.

8. The point positioning method according to claim 6, comprising the step of memorizing the carrier phases, the code pseudoranges, the clock error of the receiver, the orbit data of the satellites, the clock error data of the satellites, the delay data of the ionosphere, the delay data of the troposphere over the number of epochs,
wherein: the regression equation is set by utilizing every data got over the number of epochs.

9. The point positioning method according to claim 6, wherein: a state estimation algorithm is applied to the regression equation.

10. The point positioning method according to claim 6, wherein: the positions of the satellites are estimated by utilizing the regression equation;
the objective variables further include the orbit data of the satellites; and
the explanatory variables further include errors of the satellite's orbits.

11. A point positioning apparatus which detects distances between a receiver and satellites and a position of the receiver by utilizing satellite signals transmitted from the satellites, comprising:
a satellite data observing device which observes orbit data of the satellites and clock errors of the satellites from a navigation message included in the satellites signals or estimated values by off-line processing;
an ionosphere data getting device which gets delay data of an ionosphere;
a troposphere data getting device which gets delay data of troposphere; and
a position estimating device which:
linear-approximate the position of the receiver with a Linear Taylor series expansion about a estimated receiver's position by using the estimation results of previous positions of the receiver and the orbit data of the satellites,
sets up explanatory variables, as unknown values, that include the linear-approximated position of the receiver, an integer ambiguity, a clock error of the receiver, clock errors of the satellites, delays of the ionosphere, delays of the troposphere,
sets up objective variables, as observational values, that include carrier phases, code pseudoranges, clock error data of the satellites, delay data of the ionosphere, delay data of the troposphere,
sets the regression equation by utilizing coefficients, as an operational matrix elements, that are obtained from partial differentiation of the distances linear-approximating with the Linear Taylor series expansion with respect to receiver's coordinates, and
estimates at least the position of the receiver by applying a parameter estimation algorithm to the regression equation.

12. A point positioning method for detecting distance between a receiver and satellites and a position of the receiver by utilizing satellite signals transmitted from the satellites, comprising the step of:
observing orbit data of the satellites and clock errors of the satellites from a navigation message included in satellite signals or estimated values by off-line processing;
getting delay data of an ionosphere and delay data of a troposphere;
linear-approximating the position of the receiver with a Linear Taylor series expansion about a estimated receiver's position by using the estimation results of previous positions of the receiver and the orbit data of the satellites;
setting up explanatory variables, as unknown values, that include the linear-approximated position of the receiver, an integer ambiguity, a clock error of the receiver, clock errors of the satellites, delays of the ionosphere, delays of the troposphere;
setting up objective variables, as observational values, that include carrier phases, code pseudoranges, clock error data of the satellites, delay data of the ionosphere, delay data of the troposphere;
setting the regression equation by utilizing coefficients, as an operational matrix elements, that are obtained from partial differentiation of the distances linear-approximating with the Linear Taylor series expansion with respect to receiver's coordinates; and
estimating at least the position of the receiver by applying a parameter estimation algorithm to the regression equation.

* * * * *